United States Patent
McKenney

(10) Patent No.: US 8,407,503 B2
(45) Date of Patent: Mar. 26, 2013

(54) MAKING READ-COPY UPDATE FREE-RUNNING GRACE PERIOD COUNTERS SAFE AGAINST LENGTHY LOW POWER STATE SOJOURNS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/891,196

(22) Filed: Sep. 27, 2010

(65) Prior Publication Data

US 2012/0079301 A1 Mar. 29, 2012

(51) Int. Cl.
*G06F 1/32* (2006.01)
*G06F 1/00* (2006.01)
(52) U.S. Cl. .................. 713/321; 713/322; 713/323
(58) Field of Classification Search .................. 713/321, 713/322, 323
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 3/1997 | Slingwine et al. | |
| 5,727,209 A | 3/1998 | Slingwine et al. | |
| 6,219,690 B1 | 4/2001 | Slingwine et al. | |
| 6,886,162 B1 | 4/2005 | McKenney | |
| 6,889,055 B1 * | 5/2005 | Neufeld | 455/458 |
| 6,996,812 B2 | 2/2006 | McKenney | |
| 7,287,135 B2 | 10/2007 | McKenney et al. | |
| 7,349,926 B2 | 3/2008 | McKenney et al. | |
| 7,353,346 B2 | 4/2008 | McKenney et al. | |
| 8,112,650 B2 * | 2/2012 | Qing et al. | 713/321 |
| 2004/0043798 A1 * | 3/2004 | Amerga et al. | 455/574 |
| 2005/0149634 A1 | 7/2005 | McKenney | |
| 2005/0198030 A1 | 9/2005 | McKenney | |
| 2006/0100996 A1 | 5/2006 | McKenney | |
| 2006/0112121 A1 | 5/2006 | McKenney et al. | |
| 2006/0117072 A1 * | 6/2006 | McKenney et al. | 707/201 |
| 2006/0123100 A1 | 6/2006 | McKenney | |
| 2006/0130061 A1 | 6/2006 | McKenney | |
| 2006/0265373 A1 | 11/2006 | McKenney et al. | |
| 2007/0083565 A1 | 4/2007 | McKenney | |
| 2007/0101071 A1 | 5/2007 | McKenney | |
| 2007/0198520 A1 | 8/2007 | McKenney et al. | |

(Continued)

OTHER PUBLICATIONS

J. Seigh, "RCU+SMR for preemptive kernel/user threads," Linux Kernel Mailing List, May 9, 2005, 2 pages.

(Continued)

*Primary Examiner* — Thomas Lee
*Assistant Examiner* — Robert Cassity
(74) *Attorney, Agent, or Firm* — Walter W. Duft

(57) ABSTRACT

A technique for making a free-running grace period counter safe against lengthy low power state processor sojourns. The grace period counter tracks grace periods that determine when processors that are capable executing read operations have passed through a quiescent state that guarantees the readers will no longer maintain references to shared data. Periodically, one or more processors may be placed in a low power state in which the processors discontinue performing grace period detection operations. Such processors may remain in the low power state for a complete cycle of the grace period counter. This scenario can potentially disrupt grace period detection operations if the processors awaken to see the same grace period counter value. To rectify this situation, processors in a low power state may be periodically awakened at a predetermined point selected prevent the low power state from extending for an entire roll over of the grace period counter.

20 Claims, 8 Drawing Sheets

U.S. PATENT DOCUMENTS

| | | | |
|---|---|---|---|
| 2007/0226440 A1 | 9/2007 | McKenney et al. | |
| 2007/0266209 A1* | 11/2007 | McKenney et al. | 711/154 |
| 2008/0033952 A1 | 2/2008 | McKenney et al. | |
| 2008/0040720 A1* | 2/2008 | McKenney et al. | 718/103 |
| 2008/0082532 A1 | 4/2008 | McKenney | |
| 2008/0140951 A1 | 6/2008 | McKenney et al. | |
| 2008/0177742 A1 | 7/2008 | McKenney et al. | |
| 2008/0209433 A1 | 8/2008 | McKenney | |
| 2008/0215784 A1 | 9/2008 | McKenney | |
| 2008/0229309 A1 | 9/2008 | McKenney | |
| 2008/0288749 A1 | 11/2008 | McKenney et al. | |
| 2008/0313238 A1 | 12/2008 | McKenney et al. | |
| 2008/0320262 A1 | 12/2008 | McKenney et al. | |
| 2009/0006403 A1 | 1/2009 | McKenney | |
| 2009/0077080 A1* | 3/2009 | McKenney | 707/8 |
| 2009/0254764 A1* | 10/2009 | McKenney et al. | 713/300 |
| 2009/0292705 A1 | 11/2009 | McKenney et al. | |
| 2010/0023559 A1 | 1/2010 | McKenney et al. | |
| 2010/0023946 A1* | 1/2010 | McKenney | 718/102 |
| 2010/0070786 A1* | 3/2010 | Qing et al. | 713/321 |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. McKenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI'04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb 4, 2007, 3 pages.

McKenney, "Seven real-time Linux approaches (Part C)", LinuxDevices.com, Jun. 7, 2005, 13 pages.

P. McKenney, " RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN.net, Oct. 1, 2006, 6 pages.

P. Mckenney, "Sleepable RCU", LWN.net, Oct. 9, 2006, 10 pages.

O. Nesterov, "cpufreq_tsc() as core_initcall_sync", LKML.org, Nov. 19, 2006, 2 pages.

P. McKenney, "Using RCU in the Linux 2.5 Kernel", Kernel Korner, Oct. 1, 2003,11 pages.

A. Kleen, "How to do nothing efficiently or better laziness: No Idle tick on x86-64", 2005, 16 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net, Oct. 8, 2007, 27 pages.

P. McKenney, "Integrating and Validating dynticks and Preemptible RCU," LWN.net, Apr. 22, 2008, 19 pages.

P. McKenney, "Hierarchical RCU," LWN.net, Nov. 4, 2008, 19 pages.

P. McKenney et al., "Introducing Technology Into the Linux Kernel: A Case Study," Aug. 7, 2008, 14 pages.

P. McKenney, "Is Parallel Programming Hard, and, If So, What Can You Do About It," Mar. 8, 2009, 146 pages.

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

P. McKenney et al., "Exploiting Deferred Destruction: An Analysis of Read-Copy-Update Techniques in Operating System Kernels", Jan. 3, 2005, pp. 1-41.

C. Rossbach et al., "TxLinux: Using and Managing Hardware Transactional Memory in an Operating System", ACM Digital Library, Oct. 2007, pp. 87-99.

Makris et al., "Dynamic and Adaptive Updates of Non-Quiescent Subsystems in Commodity Operating System Kernels", ACM Digital Library, Mar. 2007, pp. 327-337.

* cited by examiner

|      | CPU 0 | CPU 1 | CPU 2 | CPU 3 | CPU 4 | CPU 5 | CPU 6 | CPU 7 |
|------|-------|-------|-------|-------|-------|-------|-------|-------|
| GP 0 | C     | C     | C     |       |       |       |       |       |
| GP 1 |       |       |       | C     | C     | C     |       |       |
| GP 2 | C     |       |       |       |       |       | W     | W     |
| GP 3 |       | W     | W     | W     |       |       |       |       |
| GP 0 |       |       |       |       | W     | W     | W     |       |
| GP 1 | C     | W     |       |       |       |       |       | W     |
| GP 2 |       |       | W     | W     | W     |       |       |       |
| GP 3 |       |       |       |       |       | W     | W     | W     |
| GP 0 | C     | W     | W     |       |       |       |       |       |

FIG. 7A

|      | CPU 0 | CPU 1 | CPU 2 | CPU 3 | CPU 4 | CPU 5 | CPU 6 | CPU 7 |
|------|-------|-------|-------|-------|-------|-------|-------|-------|
| GP 0 | C     | C     |       |       |       |       |       |       |
| GP 1 |       |       | C     | C     |       |       |       |       |
| GP 2 |       |       |       |       | W     | W     |       |       |
| GP 3 |       |       |       |       |       |       | W     | W     |
| GP 0 | C     | W     |       |       |       |       |       |       |
| GP 1 |       |       | W     | W     |       |       |       |       |
| GP 2 |       |       |       |       | W     | W     |       |       |
| GP 3 |       |       |       |       |       |       | W     | W     |
| GP 0 | C     | W     |       |       |       |       |       |       |

FIG. 7B

MAKING READ-COPY UPDATE FREE-RUNNING GRACE PERIOD COUNTERS SAFE AGAINST LENGTHY LOW POWER STATE SOJOURNS

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a computing environment wherein processors are capable of assuming low-power states and grace periods that are measured by free-running counters.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is available for the benefit of operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization or a designated update thread could be used to serialize data updates. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes (or threads within a process) having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU running non-preemptible code (as can other operations that will not be listed here). In some read-copy update implementations adapted for preemptible readers, all read operations that are outside of an RCU read-side critical section are quiescent states.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

Grace periods may be detected synchronously or asynchronously. According to the synchronous technique, updaters perform the first phase update operation, block (wait) until a grace period has completed, and then implement the second phase update operation, such as removing stale data. Asynchronous grace period detection allows updaters to specify the second phase update operation as a callback, then resume other processing with the knowledge that their callback(s) will eventually be processed at the end of a grace period. Advantageously, callbacks requested by one or more updaters can be batched (e.g., on callback lists) and processed as a group at the end of a grace period. This allows grace period overhead to be amortized over plural deferred update operations.

It will be appreciated from the foregoing discussion that the fundamental operation of the read-copy update synchronization technique entails waiting for all readers associated with a particular grace period to complete. Multiprocessor implementations of RCU must observe or influence the actions performed by multiple processors. So-called "non-preemptible" variants of RCU require readers to avoid preemption and rescheduling. Orderly grace period processing in such implementations may then be ensured by either forcing or waiting for each reader's processor to pass through a quiescent state.

More recently, RCU grace period processing has been adapted to account for processor low power states (such as, on Intel® processors, the C1E halt state, or the C2 or deeper halt states). Operating systems can take advantage of low power state capabilities by using mechanisms that withhold regular timer interrupts from processors (in a low power state) unless the processors need to wake up to perform work. The dynamic tick framework (also called "dyntick" or "nohz") in current versions of the Linux® kernel is one such mechanism. Current RCU implementations designed for low power applications avoid unnecessary wakeups during grace period processing by treating processor low power states as extended quiescent states. Such processors do not have to wake up and perform quiescent processing as every grace period occurs (which can be many times per second).

It is to improvements in read-copy update grace period processing in low power environments that the present disclosure is directed. In particular, applicant has discovered that RCU grace period processing can be impacted when grace periods are tracked using a free-running counter and processors remain in low power states for extended periods of time, leading to potential problems such as an inability to complete grace periods or the premature termination of grace periods.

SUMMARY OF THE INVENTION

A method, system and computer program product are provided for making a free-running grace period counter safe against lengthy low power state processor sojourns. Disclosed embodiments include periodically executing read operations on one or more processors to reference shared data in a memory, periodically executing update operations on the processors to update the shared data, and periodically executing grace period detection operations on the processors in order to reclaim memory by removing stale data elements or to perform other operations. The grace period detection uses a grace period counter to track grace periods that determine when processors that may be executing read operations have passed through a quiescent state that guarantees the readers will no longer maintain references to the shared data. The grace period counter is a free-running counter having an initial count value that is incremented to start each new grace period. This incrementation continues until a maximum count value is reached and the counter rolls over to the initial count value. The grace period detection operations further include the processors periodically referencing the grace period counter, storing a per-processor copy of the current grace period count value, and performing quiescent state detection processing for each new grace period.

Periodically, one or more of the processors may be placed in a low power state in which the processors discontinue referencing the grace period counter and do not perform quiescent state detection processing. These processors may be capable of experiencing an operational scenario in which the processors remain in the low power state for a complete cycle of the grace period counter. The processors may thus enter the low power state at a first grace period count value and return to a full power state after the grace period counter has rolled over and returned to a rollover grace period count value that is the same as the first grace period count value. This may cause potential disruption of the grace period detection operations if the processors assume from their stored per-processor grace period count value being the same as the rollover grace period count that a grace period associated with the first grace period count value is still in force. To rectify this situation and prevent such potential disruption, the processors in a low power state may be periodically awakened at a predetermined point that is selected prevent the low power state from extending for a time that allows the grace period counter to roll over.

BRIEF DESCRIPTION OF THE DRAWINGS

The foregoing and other features and advantages of the invention will be apparent from the following more particular description of example embodiments, as illustrated in the accompanying Drawings, in which:

FIG. 7A is a table diagram illustrating use of the technique of FIG. 6 in an eight-processor system with a four-grace-period counter;

FIG. 7B is a table diagram illustrating further use of the technique of FIG. 6 in an eight-processor system with a four-grace-period counter;

DETAILED DESCRIPTION OF EXAMPLE EMBODIMENTS

Figure 1A:
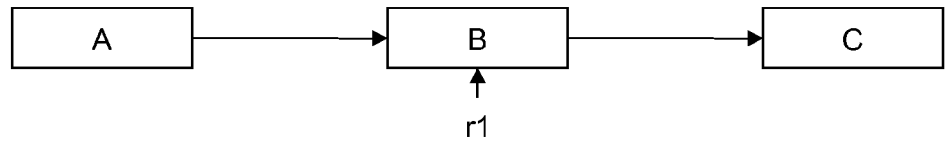
FIGS. 1A-1D are diagrammatic representations of a linked list of data elements undergoing a data element replacement according to a conventional read-copy update mechanism.
Figure 1B:
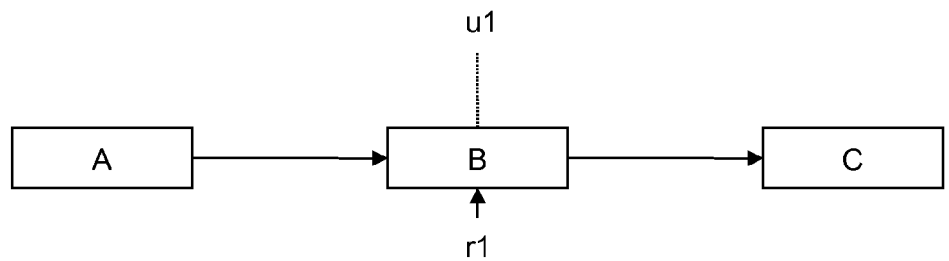
Figure 1C:
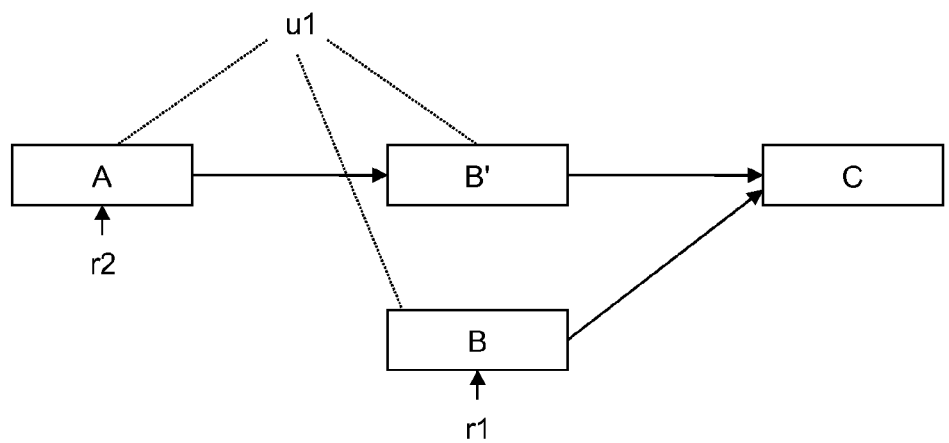
Figure 1D:
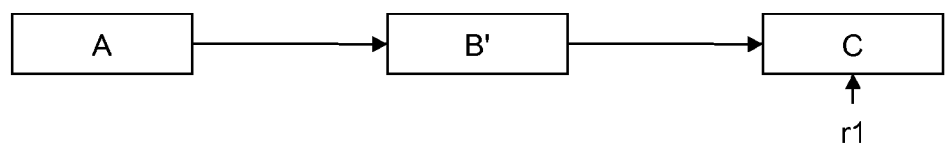
Figure 2A:
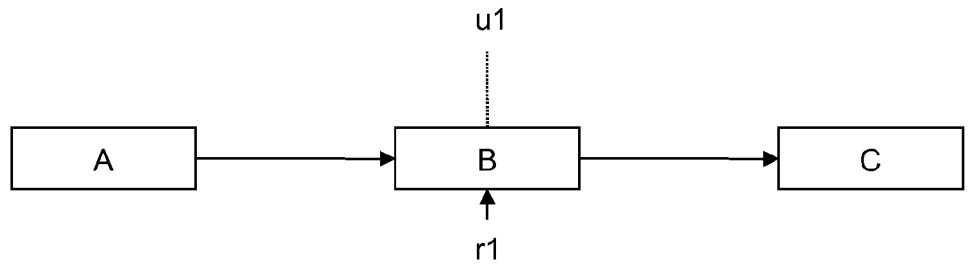
FIGS. 2A-2C are diagrammatic representations of a linked list of data elements undergoing a data element deletion according to a conventional read-copy update mechanism.
Figure 2B:
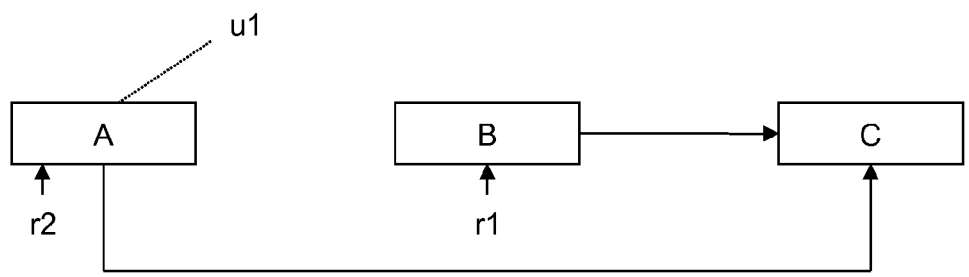
Figure 2C:
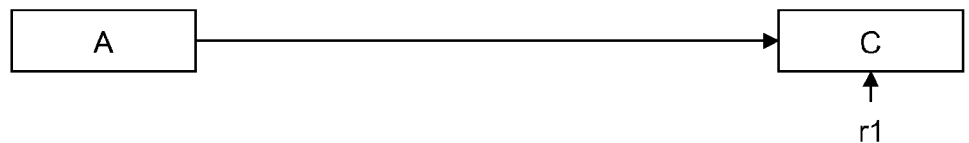
Figure 3:
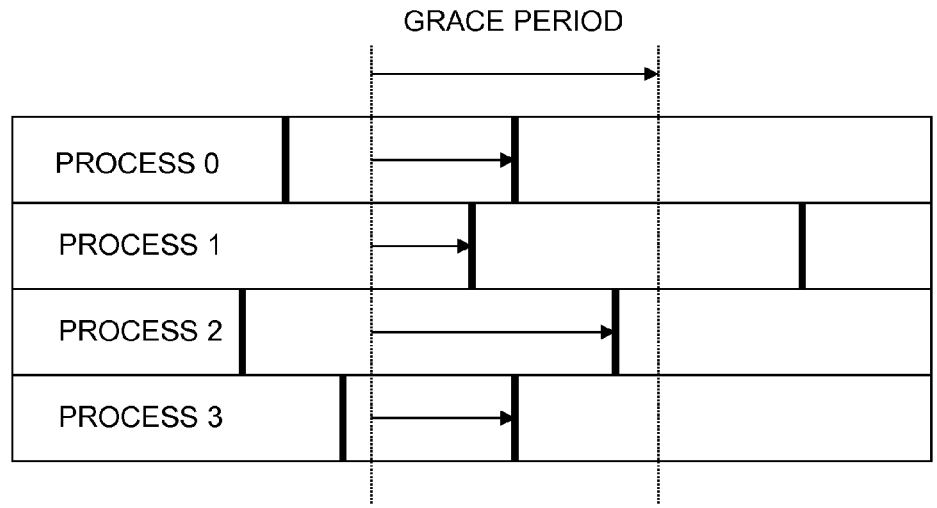
FIG. 3 is a flow diagram illustrating a grace period in which four processes pass through a quiescent state.
Figure 4:
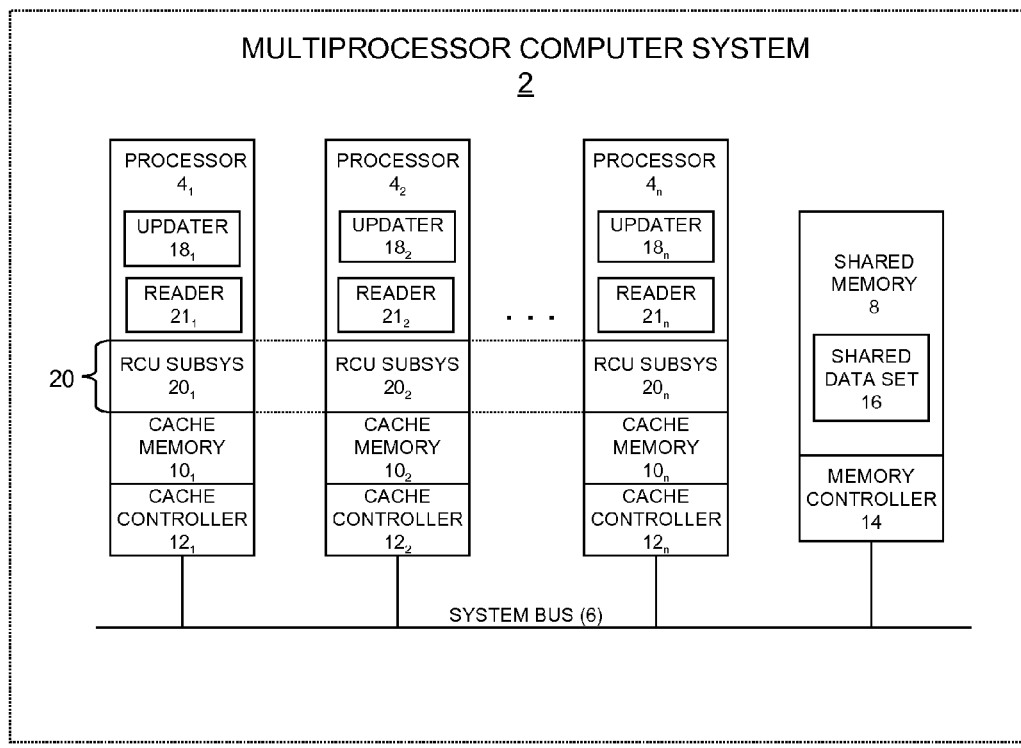
FIG. 4 is a functional block diagram showing a multiprocessor computing system that represents an example environment for implementing grace period processing in accordance with the disclosure herein.

Turning now to the figures, wherein like reference numerals represent like elements in all of the several views, FIG. 4 illustrates an example computing environment in which the grace period processing technique described herein may be implemented. In particular, an example computing system 2 is shown that may represent any of a several different types of computing apparatus. Such apparatus types, include, but are not limited to general purpose computers, special purpose computers, portable computing devices, communication and/or media player devices, set-top devices, embedded systems, to name but a few. The system 2 includes one or more processors 4 (e.g., $4_1, 4_2 \ldots 4_n$) that are connected by way of a system bus 6 (or other communication pathway) to a memory 8. As used herein, the term "processor" includes a single-threaded or multi-threaded CPU (Central Processing Unit) core within a single-core or multi-core processing device (with each core being considered a CPU) that executes program instruction logic, such as software or firmware. The memory 8 may comprise any type of tangible storage medium capable of storing data in computer readable form. The processors 4 and the memory 8 may be situated within a single computing node (e.g., as part of a single-node SMP system) or they may be distributed over plural nodes (e.g., as part of a NUMA system or cluster). Conventional cache memories 10 (e.g., $10_1, 10_2 \ldots 10_n$) and cache controllers 12 (e.g., $12_1, 12_2 \ldots 12_n$) may be respectively associated with the processors 4. A conventional memory controller 14 may be associated with the memory 8. The memory controller 14 may be integrated with the processors 4 or could be provided separately therefrom (e.g. as part of a chipset).

Update operations 18 executed within processes, threads, or other execution contexts of the processors $4_1, 4_2 \ldots 4_n$ may periodically perform updates on a set of shared data 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and other types of operations. To facilitate such updates, the several processors $4_1, 4_2 \ldots 4_n$ are programmed to implement a read-copy update (RCU) subsystem 20, as by periodically executing respective RCU instances $20_1, 20_2 \ldots 20_n$ as part of their processor functions. Each of the processors $4_1, 4_2 \ldots 4_n$ also periodically executes read operations (readers) 21. Reference numerals $21_1, 21_2 \ldots 21_n$ illustrate these individual per-processor reader instances. Such read operations will typically be performed far more often than updates, this being one of the premises underlying the use of read-copy update.

One of the functions performed by the RCU subsystem 20 is grace period detection processing for deferring the destruction of a shared data element until pre-existing references to the data element are removed. This processing entails starting new grace periods and detecting the end of old grace periods so that the RCU subsystem 20 knows when it is safe to free stale data elements (or take other actions). As described by way of background above, this may be done by either mandating processors to pass through quiescent states or by requesting voluntary quiescent states. For purposes of the present discussion, it is assumed that voluntary quiescent states are used.

The RCU subsystem 20 thus needs to coordinate with the processors $4_1, 4_2 \ldots 4_n$ to advise of new grace periods and determine when quiescent states have been reached so that grace periods can end. In an example embodiment of the RCU subsystem 20, advising of new grace periods may be accomplished by incrementing a global grace period number that the processors $4_1, 4_2 \ldots 4_n$ may periodically check. When a new grace period is detected, each of the processors $4_1, 4_2 \ldots 4_n$ will record and register a quiescent state before the new grace period can end. In an example embodiment, one way that the processors $4_1, 4_2 \ldots 4_n$ can register a quiescent state is to clear a corresponding bit in a bitmask whose per-processor bits are initialized at the start of each grace period. A grace period may be determined to end when all processors have cleared their respective bits. A new grace period may then be started by resetting all of the bits, and the grace period detection cycle (a form of a barrier computation) will repeat. The foregoing grace period detection operations may be performed by periodically running the RCU subsystem instances $20_1, 20_2 \ldots 20_n$ on each of the processors $4_1, 4_2 \ldots 4_n$. In an example embodiment, the RCU subsystem 20 may be implemented as a state machine that is invoked from an operating system scheduler and/or from a scheduling clock interrupt handler.

Figure 5:
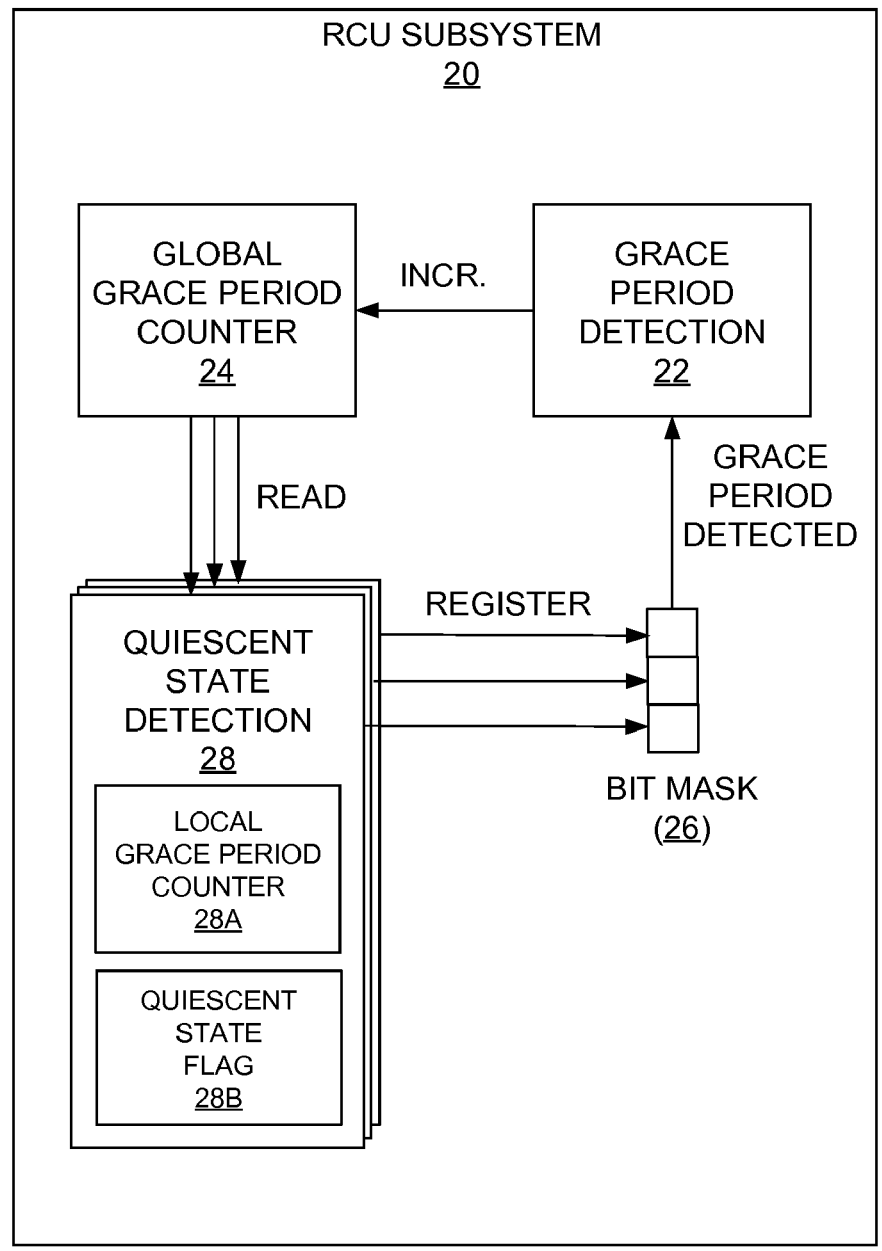
FIG. 5 is a functional block diagram showing a read-copy update subsystem that may be implemented in the multiprocessor computer system of FIG. 4.

FIG. 5 illustrates example components of the RCU subsystem 20 that may be used to perform the above operations. Grace period advancement and detection may be coordinated by grace period detection logic 22. This logic may be invoked when a processor having callbacks waiting for a grace period notices that no grace period is in progress. When this occurs, the grace period detection logic 22 increments a global grace period counter 24 to signify the start of a new period. The grace period detection logic 22 also sets the per-processor bits in a bit mask data structure 26. In an example embodiment, the data structure 26 may represent either a single bitmask used by all of the processors $4_1, 4_2 \ldots 4_n$ or a hierarchical array of bitmasks that each have a limited number of bits and associated processors. The latter implementation is used in current versions of the Linux® kernel, and provides better scalability on large systems with many processors by limiting the number of processors that contend for each bitmask. This is advantageous because each bitmask is typically protected by a lock, and limiting the number of processors reduces lock contention.

Quiescent state detection logic 28 in the RCU subsystem 20 is implemented on each of the processors $4_1, 4_2 \ldots 4_n$ in order to advance the grace periods. This logic determines from the global grace period counter 24 when a new grace period has started. The global grace period number is periodically stored as a local per-processor grace period number for use in identifying callbacks that are ready for execution on each processor. The local grace period number represents the highest grace period that the associated processor is aware of having started. A local grace period counter 28A may be used for storing the local grace period number. A quiescent state flag 28B may be used to record that the processor has passed a quiescent state following the start of a new grace period. Alternatively, in lieu of a flag, one or more counters could be used to record quiescent states. The quiescent state detection logic 28 may then register the quiescent state by clearing the corresponding bit in the bit mask data structure 26.

The above-described operations of the RCU subsystem 20 are conventional in nature and represent the kind of grace period detection processing that is performed in current non-preemptable RCU implementations. As is further conventional, the RCU subsystem 20 may be optimized to accommodate processors that are in a low power state, so that such processors will not have to wake up to observe the global grace period number, and then detect and record quiescent states. In particular, the RCU subsystem 20 may interpret a low-power processor state as a quiescent state if the low-power state signifies that no RCU readers are capable of running on the processor in question. This will the case for non-preemptible RCU because a processor may not enter a low-power state with runnable tasks and non-preemptible RCU readers always remain runnable until they pass through a quiescent state. Therefore, the RCU subsystem 20 may assume that a processor in a low power state has no active RCU readers, and need not wake up that processor. These processors are not required to clear bits in the bit mask structure 26 and grace periods may end without the grace period detection logic 22 hearing from such processors. One technique that may be used to implement this low-power optimization is disclosed in U.S. Published Patent Application No. 2010/0023732, which is commonly owned herewith. Low power-compatible grace period detection processing is also implemented in current versions of the Linux® kernel.

As described by way of background above, applicant has discovered that RCU grace period processing can be impacted when processors remain in low power states for extended periods of time, leading to potential problems such as the inability to complete grace periods or the premature termination of grace periods. The problem arises from the fact that the global grace period counter 24 is a free-running counter that eventually rolls over and resets to zero after some number of grace periods. The upper limit of the grace period counter 24 is determined by its size. For example, if the grace period counter 24 is 32 bit memory location or register, it would be capable of tracking $2^{32}$ grace periods before rolling over. A 64 bit implementation of the grace period counter 24 would have an upper limit of $2^{64}$ grace periods, and so on.

As long as processors do not remain in a low power state for extended periods of time, there will normally be no problem arising from the use of a free-running counter as the grace period counter 24. However, as the power conservation capabilities of modern operating systems, such as the Linux® kernel, continue to improve, there may come a time when RCU's ability to tolerate seven-week dyntick-idle sojourns on 32-bit machines (for HZ=1000) will prove insufficient, potentially resulting in premature grace periods. Although the use of 64-bit counters would extend this time period out beyond a million years, handheld devices will likely continue using 32-bit kernels for some time to come. And there are already SMP handheld devices that might well keep all but one CPU powered down unless or until the user starts some CPU-intensive operation (e.g., viewing video).

Assuming one more of the processors $4_1$, $4_2$ . . . $4_n$ is allowed to remain in a low power state for an entire run through the grace period counter 24, several error scenarios may be envisioned that could adversely affect grace period processing as a result of this situation.

One possible error scenario is as follows:

At grace period 1, processor $4_1$ goes into dyntick-idle state, but only after recording and registering a quiescent state for grace period 1.

Some other processor ends grace period 1 as soon as the grace period detection logic 22 accounts for all other processors (by seeing the cleared bit mask 26).

Many grace periods pass, with processor $4_1$ still in dyntick-idle state. This means that processor $4_1$ still believes that grace-period 1 is in effect based on its local grace period counter 28A. Normally this would not be a problem, as the processor would check the global grace period counter 24 and detect the actual grace period count soon after coming out of dyntick-idle state. Unless . . . .

Lots of grace period pass, so that the grace period counter 24 overflows to 0.

Some other processor has already noticed that processor $4_1$ is in dyntick-idle state, so grace period 0 ends and grace period 1 begins.

At about this time, processor $4_1$ comes out of dyntick-idle state, and sees that it is still grace period 1, to which it has already responded. It therefore declines to respond, The other processors see that processor $4_1$ is not in dyntick-idle state, so they wait for the processor to register a quiescent state for grace period 1 by clearing its bit in the bit mask 26. This will never occur, so grace periods are hung until such time as processor $4_1$ goes back into dyntick-idle state.

Unfortunately there is no guarantee that processor $4_1$ will ever return to dyntick-idle state, especially if the system runs out of memory first due to ability to complete the grace period and process callbacks.

Another possible error scenario is as follows:

At grace period 1, processor $4_1$ goes into dyntick-idle state, but only after recording a quiescent state without having an opportunity to register the quiescent state by clearing its bit in the bitmask 26.

Some other processor notices that processor $4_1$ is in dyntick-idle state, so the grace period detection logic 22 ends grace period 1 as soon it accounts for all other processors (by seeing the cleared bit mask 26).

Many grace periods pass, with processor $4_1$ still in dyntick-idle state. This means that processor $4_1$ still believes that grace-period 1 is in effect based on its local grace period counter 28A. Normally this would not be a problem, as the processor would check the global grace period counter 24 and detect the actual grace period count soon after coming out of dyntick-idle state. Unless . . . .

Lots of grace period pass, so that the grace period counter 24 overflows to 0.

Some other processor has already noticed that processor $4_1$ is in dyntick-idle state, so grace period 0 ends and grace period 1 starts.

At about this time, processor $4_1$ comes out of dyntick-idle state, sees that grace period 1 is still in effect and the processor has recorded a quiescent state, so it registers it—erroneously, as it has not yet passed through a quiescent state for the new grace period 1, but rather for the old one;

Grace period 1 thus ends prematurely, possibly impacting a reader on processor $4_1$ that may be accessing a shared data element that is being freed from memory.

The second scenario could potentially be avoided by invalidating any quiescent states recorded when going into (or coming out of) dyntick-idle mode. However, no such local-only solution exists for the first scenario, and solutions involving acquiring locks are too heavyweight for use on the dyntick-idle path.

Figure 6:
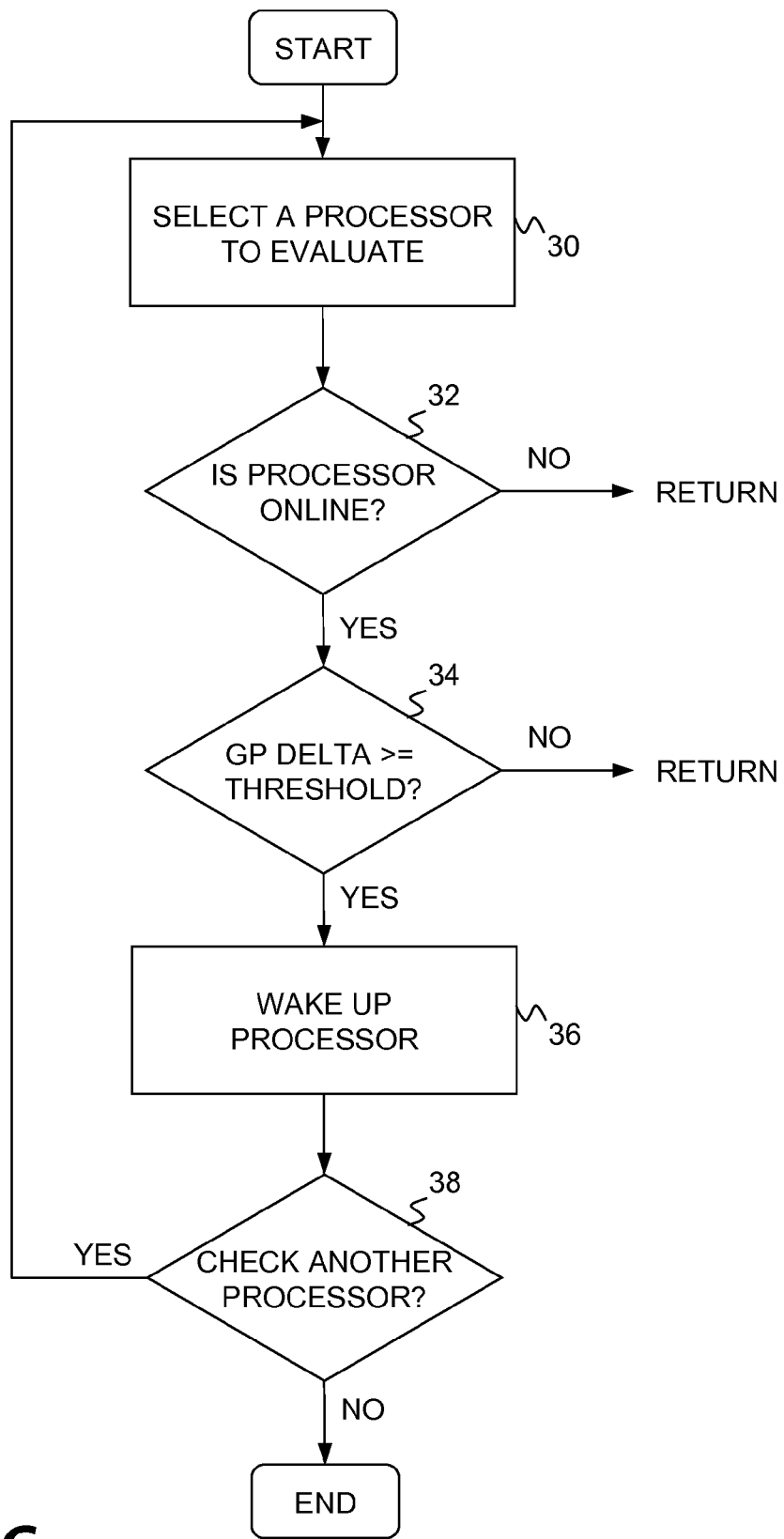
FIG. 6 is a flow diagram showing an example technique for making a free-running grace period counter safe against lengthy low power state sojourns.

With reference now to FIG. 6, an example solution that makes the free-running grace period counter 24 safe against long processor sojourns in dyntick-idle state (or other low power states) will now be described. The solution represents a processor checking operation to determine whether there are processors in a low power state whose local grace period count has fallen substantially behind the global grace period count, such that there is a possibility of the processor awakening after a global grace period count cycle and counter reset. The processor checking operation of FIG. 6, may be implemented at any suitable point during the operations of the grace period detection logic 22. By way of example only, it may be performed each time one of the processors $4_1, 4_2 \ldots 4_n$ starts a new grace period. The check can be made with respect to one or more processors per grace period. Once all processors have been checked, the cycle may repeat.

Beginning in block 30 of FIG. 6, one of the processors $4_1, 4_2 \ldots 4_n$ is selected for evaluation. In block 32, a check is made to determine whether the processor is currently online. If not, the processor checking operation returns without further evaluation. This is because an offline processor will always reset its grace period number when it comes back online, and thus will not be susceptible to the grace period counter wrapping problem described above. In block 34, a check is made to determine whether the difference between the processor's local grace period number as stored in local counter 28A and the global grace period number as stored in global counter 24 equals or exceeds some threshold count differential. This grace period differential is referred to in FIG. 6 as "GP Delta." It should be noted that block 34 also represents an implicit check as to whether the processor is in a lower power state insofar as fully functional processors will usually have local grace periods that differ very little from the global grace period. If block 34 produces a negative result, the processor checking operation returns without further evaluation. If block 34 produces a positive result, block 36 is implemented and the processor is awakened, such as by rescheduling it for execution. Block 38 reiterates blocks 30-36 if additional processors are to be checked in the current grace period. Otherwise, the processor checking operation concludes.

The threshold value used in block 34 and the number of processors checked per grace period are matters of design choice that may be selected based on system configuration and operational requirements. Using a very small threshold (e.g., several grace periods) may result in unnecessary processor wakeups. In an example embodiment, only one processor is checked per grace period and a threshold of one-half the size of a 32 bit grace period counter is used. In that case, a low-power processor will be woken up when the global grace period number has gone at least half way toward wrapping past the processor's local grace period number.

Note that using a threshold larger than one-half of the maximum grace period count may be problematic depending on how often each processor is checked (the processor check interval). This interval will depend on the number of processors that are present in the system 2 and how many of these are checked per grace period. If there are many processors and only one or a small number of processors is checked each grace period, using a large threshold (e.g., between 50-100% of the grace period count maximum) may result in some processors not being checked before the global grace period counter 24 cycles through and resets. To illustrate, assume that the grace period counter maximum is 100 grace periods and the threshold is 52 grace periods. Assume further that the processor check interval is 51 grace periods because there are 51 processors and only 1 is checked per grace period. If the $51^{st}$ processor is in a low power state when it is checked, it would not be woken up because the 52 grace period threshold has not been reached. The threshold would be met during the next check of this processor at 102 grace periods, but the grace period counter would have already rolled over, thereby exposing the $51^{st}$ processor to the problem scenarios discussed above. This problem may be avoided if multiple processors are checked in a single grace period, thereby reducing the processor check interval. However, doing so will increase grace period processing overhead, which may not be acceptable, particularly if real-time response is important.

In general, it may be desirable to select the threshold to ensure that it will be less than or equal to the largest multiple of the check interval that does not exceed the counter maximum. To illustrate, consider an example where the counter maximum is 100 grace periods. A counter check interval of 40 grace periods would require a threshold that is not more than 2×40=80 grace periods. If the threshold was larger, the processor would not be awakened until its third check at 120 grace periods, which is beyond the 100 grace period count maximum. Similarly, a counter check interval of 15 grace periods would require a threshold of not more than 6×15=90 grace periods. Using a larger threshold would not result in the processor being awakened until its seventh check at 105 grace periods, which is again too late.

Keeping the threshold at one half the counter maximum is a safe bet insofar as it will guarantee a wake up regardless of the check interval. For example, using the foregoing example in which the counter maximum is 100 grace periods, the maximum threshold could be set at 50 grace periods. Check intervals ranging from 1-50 grace periods could repeat one or more times before reaching the 100 grace period counter maximum. However, these checks would reach the 50 grace period threshold before any multiple thereof reaches 100 grace periods. All low power state processors would be awakened before the grace period counter maximum is reached. Check intervals ranging from 51-100 grace periods do not have multiples less than 100, but the 50 grace period threshold would be exceeded before any of these check intervals occur. Again, all low power state processors would be awakened before the grace period counter maximum is reached.

A further restraint on the processing of FIG. 6 is that the number of processors should not exceed the capacity of the grace period counter 24 unless plural processors are checked each grace period. Although the processor count is not likely to be anywhere near to the capacity of a 32 bit grace period counter, the issue could arise on memory-constrained systems that choose to use a very small (e.g., 2 bit) grace period counter. Indeed, there are existing user-level RCU implementations that use a one-bit grace period counter. As indicated, the solution for such systems is to check enough processors at one time to avoid the possibility of overflow. For example, consider a two-bit grace period counter on a system with eight processors. The counter maximum is four grace periods. Checking three processors per grace period will suffice when the grace period threshold in block 34 of FIG. 6 is two grace periods (one half of the counter maximum).

FIG. 7A is illustrative. In this table, a first processor (CPU 0) is awake and performing grace period detection while the remaining processors (CPUs 1-7) are in a low power state. It will be seen that three processors are checked during each grace period. This may include periodic self checks by CPU 0 of its own status. Alternatively, self-checking may be eliminated. The "C" indicator represents a processor check per block 34 of FIG. 6 in which the processor is found to be in a full power execution state. The "W" indicator represents a processor check per block 34 of FIG. 6 in which the grace period delta meets or exceeds the two grace period threshold, and the processor is therefore woken up. It will be seen in FIG. 7A that by checking three processors at a time, the maximum time each processor spends is a low power state is three grace periods, which is less than the grace period counter maximum of four grace periods.

Note that a problem would have arisen if a grace period threshold of three grace periods had been used. For example, for the processor identified as CPU 1, the wake up at the first instance of grace period 3 would have updated this processor's grace local period counter to the same grace period value. However, the next check at the second instance of grace period 1 would not have resulted in a wake up because the three grace period threshold has not been reached. The CPU1 processor would have remained in a low power state until the next check at the third instance of grace period 0. Meanwhile, the grace period counter 24 would have rolled over in the interim and exposed CPU 1 to the problem scenarios discussed above. Similar problems would have arisen for the processors designated as CPU 2 (wake up would be missed at the third instance of grace period 0), CPU 4 (wake up would be missed at the second instance of grace period 2), CPU 6 (wake up would be missed at the second instance of grace period 0) and CPU 7 (wake up would be missed at the second instance of grace period 3).

FIG. 7B illustrates another problematic implementation of the processor checking of FIG. 6 on a machine whose processor count (eight processors) is larger than the grace period counter maximum (four grace periods). In this table, only two processors are checked per grace period. It will be seen that this makes the processor check interval too large, allowing the grace period counter to roll over between successive checks of each processor.

It should be noted that some embodiments of the system 2 may implement different flavors of RCU, such as one for protecting normal kernel read operations, another for protecting read operations performed in bottom half context, etc. Each RCU flavor will typically track its own grace periods independently of other flavors, and thus each flavor may be susceptible to the grace period counter rollover problem described above. One way to address this issue would be to have one RCU flavor perform the processor check operations of FIG. 6 on behalf of all RCU flavors. However, this may be vulnerable to a situation wherein the flavor performing the checking has infrequent grace periods and an overflow occurs in one of the other flavors. One way to avoid this problem would be to have each RCU flavor perform its own processor check operations. Another solution would be to share state information between all flavors that indicates which processor is to be checked. The next flavor to run the processor check operation would be the one that checks the current processor, and so on. In this way, all of the flavors could participate in coordinated checking of the processors. The shared state information could be protected by a separate global lock. Alternatively, the state information could be manipulated atomically (e.g., via compare-and-swap operations). A further solution would be to modify FIG. 6 to perform processor checking based on a selected time interval rather than grace periods. However, the chosen time period may limit the time that some processors remain in a low power state, which might not be acceptable for all applications.

It should be understood that the processor checking of FIG. 6 represents one example embodiment for protecting low power state processors from the effects of grace period counter rollovers. It is not, however, the only technique for addressing this problem.

Figure 8:
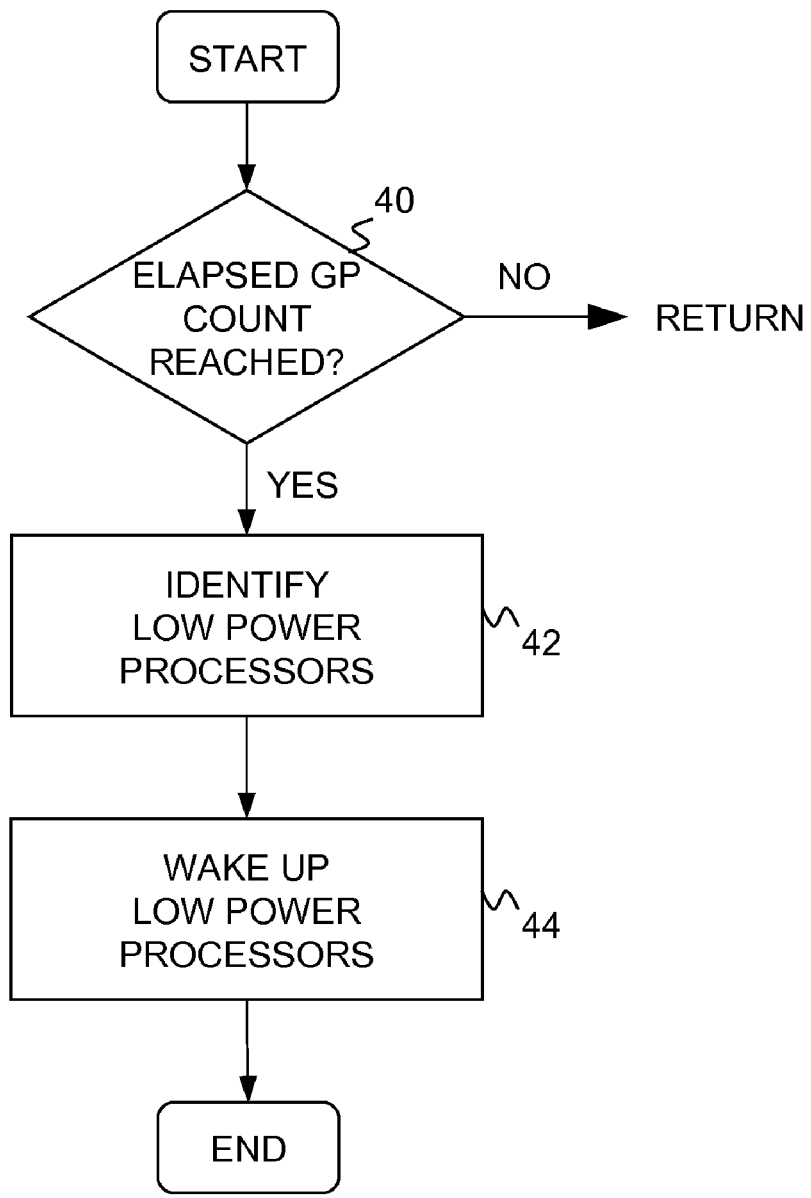
FIG. 8 is a flow diagram showing another example technique for making a free-running grace period counter safe against lengthy low power state sojourns.

In another example embodiment, the grace period detection logic 22 could wake up all low power state processors (e.g., via a rescheduling IPI (InterProcessor Interrupt)) after a fixed number of grace periods without regard to per-processor grace period counts. This processing is illustrated in FIG. 8. Block 40 checks whether the desired number of grace periods has elapsed. Block 42 identifies all processors that are in a low power state. Block 44 wakes up the identified processors. By way of example, such a wake up could be performed every $2^{31}$ grace periods, which could be checked for by looking at the low-order 31 bits of the global grace-period counter 24. This approach unnecessarily degrades real-time response, has the disadvantage of unnecessarily waking up processors that would have woken up in time regardless, and limits the amount of time that the processor can remain in a low power state, which might not be acceptable for all applications.

In a further example embodiment, instead of performing the processor checking operations of FIG. 6 at the start of each grace period, the grace period detection logic 22 could check low power state processors in another part of its state machine operations, and wake up such processors if they have been a low power state for too long (as per FIG. 6). For example, recent implementations of RCU in the Linux® kernel include a grace period detection operation that forces quiescent states on processors that require it. Part of this operation involves checking all processors that are in low power states. Thus, this portion of the grace period detection state machine could be modified to add an additional check for low power state processors with lagging grace period counts. This can be a reasonable alternative to doing such work at the beginning of each grace period, but it may be important to avoid waking up too many processors during a grace period detection operation if real-time response is important.

In a still further example embodiment, the operations of FIG. 6 could be performed as described above (at any suitable point in the grace period detection state machine), but with checking (and potentially waking up) all processors in a single grace period. This embodiment has the advantage of simplicity, but can degrade real-time response, so is applicable mainly to non-realtime systems.

Figure 9:
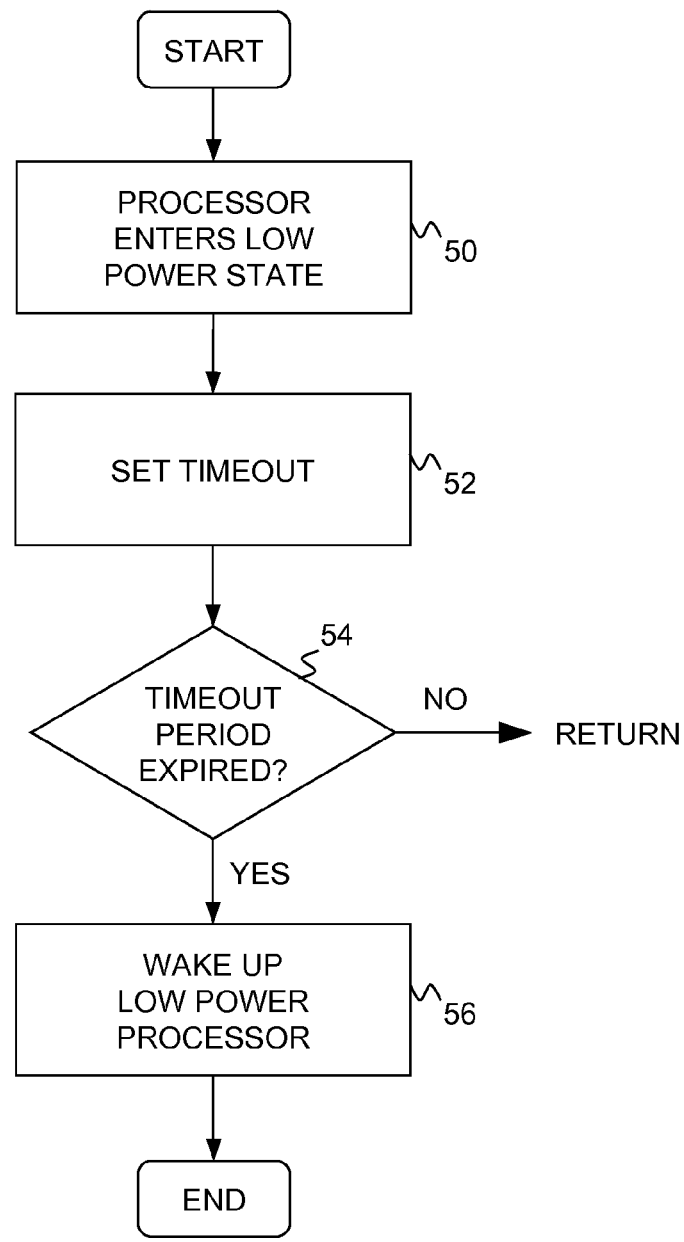
FIG. 9 is a flow diagram showing a further example technique for making a free-running grace period counter safe against lengthy low power state sojourns.

In a still further example embodiment, the grace period detection logic 22 could maintain a fixed timeout on each processor that is sufficient to prevent the processors from staying in a low power state for long enough for the global grace-period counter 24 to overflow (for example, with a one-day duration). This processing is illustrated in FIG. 9. In block 50 a processor enters a low power state. A timeout period is set in block 52, as by initializing a timer. Block 54 checks whether the timeout period has elapsed, returning if it has not. When the timeout period expires, block 56 wakes up the processor. This embodiment limits the time that processors can remain in a low power state, which might not be acceptable for all applications, but is extremely simple where it does apply.

Accordingly, a technique for has been disclosed for making free-running grace period counters safe against lengthy low power state sojourns. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 4-9. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 10:
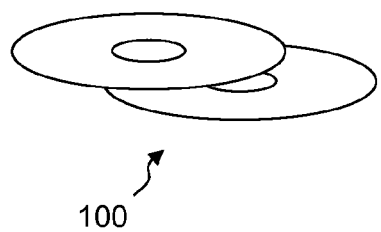
FIG. 10 is a diagrammatic illustration showing media that may be used to provide a computer program product in accordance with the disclosure herein.

Example data storage media for storing such program instructions are shown by reference numerals 8 (memory) and 10 (cache) of the system 2 of FIG. 4. The system 2 may further include a disk storage device (not shown) that could store the program instructions between system reboots. A further example of media that may be used to store the program instructions is shown by reference numeral 100 in FIG. 10. The media 100 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The media could also be provided by portable magnetic storage media (such as floppy disks, flash memory sticks, etc.), or magnetic storage media combined with drive systems (e.g. disk drives), or storage media incorporated in data processing platforms, such as random access memory (RAM), read-only memory (ROM) or other semiconductor or solid state memory. More broadly, the media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of media, when the program instructions are loaded into and executed by an instruction execution system, apparatus or device, the resultant programmed system, apparatus or device becomes a particular machine for practicing embodiments of the method(s) and system(s) described herein.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a computing system having at least two processors operatively coupled to a memory, a method for making a free-running grace period counter safe against lengthy low power state processor sojourns, comprising:
   periodically executing read operations on said processors to reference shared data in said memory;
   periodically executing update operations on said processors to update said shared data in said memory;
   periodically executing grace period detection operations on said processors in order to reclaim memory by removing stale data elements or to perform other operations;
   said grace period detection operations using a grace period counter to track grace periods, said grace periods determining when said processors executing said read operations have passed through a quiescent state that guarantees said read operations can no longer maintain references to said shared data;
   said grace period counter being a free-running counter having an initial count value that is incremented to start a new grace period until a maximum count value is reached and said counter rolls over to said initial count value;
   said grace period detection operations further including said processors periodically referencing said grace period counter, storing a per-processor copy of said grace period counter's current grace period count value, and performing quiescent state detection processing for each new grace period;
   periodically placing one or more of said processors in a low power state in which said processors discontinue referencing said grace period counter and do not perform quiescent state detection processing;
   said processors being capable of experiencing an operational scenario in which said processors remain in said low power state for a complete cycle of said grace period counter, and in which said processors enter said low power state at a first grace period count value and return to a full power state after said grace period counter has rolled over and returned to a rollover grace period count value that is the same as said first grace period count value;
   said operational scenario causing potential disruption of said grace period detection operations if said processors assume from their stored grace period count value being the same as said rollover grace period count that a grace period associated with said first grace period count value is still in force; and
   preventing said potential disruption by periodically waking said processors in said low power state at a predetermined point that is selected prevent said low power state from extending for a time that allows said grace period counter to roll over.

2. A method in accordance with claim 1, wherein said preventing includes periodically checking said processors to determine whether a differential between a current count value of said grace period counter and said stored grace period value of said processors has reached a predetermined threshold, and awakening said processors if said threshold has been reached.

3. A method in accordance with claim 2, wherein said checking is performed at a predetermined check interval and said threshold is selected according to said check interval to ensure that said threshold will be reached and said one or more processors will be checked and awakened within one cycle of said grace period counter.

4. A method in accordance with claim 3, wherein said threshold is not more than one half of said grace period counter maximum count value.

5. A method in accordance with claim 4, wherein said checking is performed each grace period with respect to one or more processors, and said check interval is determined by the number of said processors that are checked per grace period.

6. A method in accordance with claim 1, wherein said preventing includes waking up all of said processors that are in a low power state during a single grace period after a predetermined grace period count interval has been reached.

7. A method in accordance with claim 1, wherein said preventing includes maintaining a fixed timeout period for each of said processors that enter said low power state, and waking up said processors from said low power state when said fixed timeout period has been reached.

8. A system, comprising:
   one or more processors;
   a memory coupled to said one or more processors, said memory including a computer useable medium tangibly embodying at least one program of instructions executable by said processor to perform operations for making a free-running grace period counter safe against lengthy low power state processor sojourns, said operations comprising:

periodically executing read operations on said processors to reference shared data in said memory;

periodically executing update operations on said processors to update said shared data in said memory;

periodically executing grace period detection operations on said processors in order to reclaim memory by removing stale data elements or to perform other operations;

said grace period detection operations using a grace period counter to track grace periods, said grace periods determining when said processors executing said read operations have passed through a quiescent state that guarantees said read operations can no longer maintain references to said shared data;

said grace period counter being a free-running counter having an initial count value that is incremented to start a new grace period until a maximum count value is reached and said counter rolls over to said initial count value;

said grace period detection operations further including said processors periodically referencing said grace period counter, storing a per-processor copy of said grace period counter's current grace period count value, and performing quiescent state detection processing for each new grace period;

periodically placing one or more of said processors in a low power state in which said processors discontinue referencing said grace period counter and do not perform quiescent state detection processing;

said processors being capable of experiencing an operational scenario in which said processors remain in said low power state for a complete cycle of said grace period counter, and in which said processors enter said low power state at a first grace period count value and return to a full power state after said grace period counter has rolled over and returned to a rollover grace period count value that is the same as said first grace period count value;

said operational scenario causing potential disruption of said grace period detection operations if said processors assume from their stored grace period count value being the same as said rollover grace period count that a grace period associated with said first grace period count value is still in force; and preventing said potential disruption by periodically waking said processors in said low power state at a predetermined point that is selected prevent said low power state from extending for a time that allows said grace period counter to roll over.

9. A system in accordance with claim 8, wherein said preventing includes periodically checking said processors to determine whether a differential between a current count value of said grace period counter and said stored grace period value of said processors has reached a predetermined threshold, and awakening said processors if said threshold has been reached.

10. A system in accordance with claim 9, wherein said checking is performed at a predetermined check interval and said threshold is selected according to said check interval to ensure that said threshold will be reached and said one or more processors will be checked and awakened within one cycle of said grace period counter.

11. A system in accordance with claim 10, wherein said threshold is not more than one half of said grace period counter maximum count value.

12. A system in accordance with claim 11, wherein said checking is performed each grace period with respect to one or more processors, and said check interval is determined by the number of said processors that are checked per grace period.

13. A system in accordance with claim 8, wherein said preventing includes waking up all of said processors that are in a low power state during a single grace period after a predetermined grace period count interval has been reached.

14. A system in accordance with claim 8, wherein said preventing includes maintaining a fixed timeout period for each of said processors that enter said low power state, and waking up said processors from said low power state when said fixed timeout period has been reached.

15. A computer program product, comprising:

one or more machine-useable storage media;

program instructions provided by said one or more media for programming a data processing platform to perform operations for making a free-running grace period counter safe against lengthy low power state processor sojourns, said operations comprising:

periodically executing read operations on said processors to reference said shared data in said memory;

periodically executing update operations on said processors to update said shared data in said memory;

periodically executing grace period detection operations on said processors in order to reclaim memory by removing stale data elements or to perform other operations;

said grace period detection operations using a grace period counter to track grace periods, said grace periods determining when said processors executing said read operations have passed through a quiescent state that guarantees said read operations can no longer maintain references to said shared data;

said grace period counter being a free-running counter having an initial count value that is incremented to start a new grace period until a maximum count value is reached and said counter rolls over to said initial count value;

said grace period detection operations further including said processors periodically referencing said grace period counter, storing a per-processor copy of said grace period counter's current grace period count value, and performing quiescent state detection processing for each new grace period;

periodically placing one or more of said processors in a low power state in which said processors discontinue referencing said grace period counter and do not perform quiescent state detection processing;

said processors being capable of experiencing an operational scenario in which said processors remain in said low power state for a complete cycle of said grace period counter, and in which said processors enter said low power state at a first grace period count value and return to a full power state after said grace period counter has rolled over and returned to a rollover grace period count value that is the same as said first grace period count value;

said operational scenario causing potential disruption of said grace period detection operations if said processors assume from their stored grace period count value being the same as said rollover grace period count that a grace period associated with said first grace period count value is still in force; and preventing said potential disruption by periodically waking said processors in said low power state at a predetermined point that is selected prevent said low power state from extending for a time that allows said grace period counter to roll over.

16. A computer program product in accordance with claim 15, wherein said preventing includes periodically checking said processors to determine whether a differential between a current count value of said grace period counter and said stored grace period value of said processors has reached a predetermined threshold, and awakening said processors if said threshold has been reached.

17. A computer program product in accordance with claim 16, wherein said checking is performed at a predetermined check interval and said threshold is selected according to said check interval to ensure that said threshold will be reached and said one or more processors will be checked and awakened within one cycle of said grace period counter.

18. A computer program product in accordance with claim 17, wherein said checking is performed each grace period with respect to one or more processors, and said check interval is determined by the number of said processors that are checked per grace period.

19. A computer program product in accordance with claim 15, wherein said preventing includes waking up all of said processors that are in a low power state during a single grace period after a predetermined grace period count interval has been reached.

20. A computer program product in accordance with claim 15, wherein said preventing includes maintaining a fixed timeout period for each of said processors that enter said low power state, and waking up said processors from said low power state when said fixed timeout period has been reached.

* * * * *